UNITED STATES PATENT OFFICE.

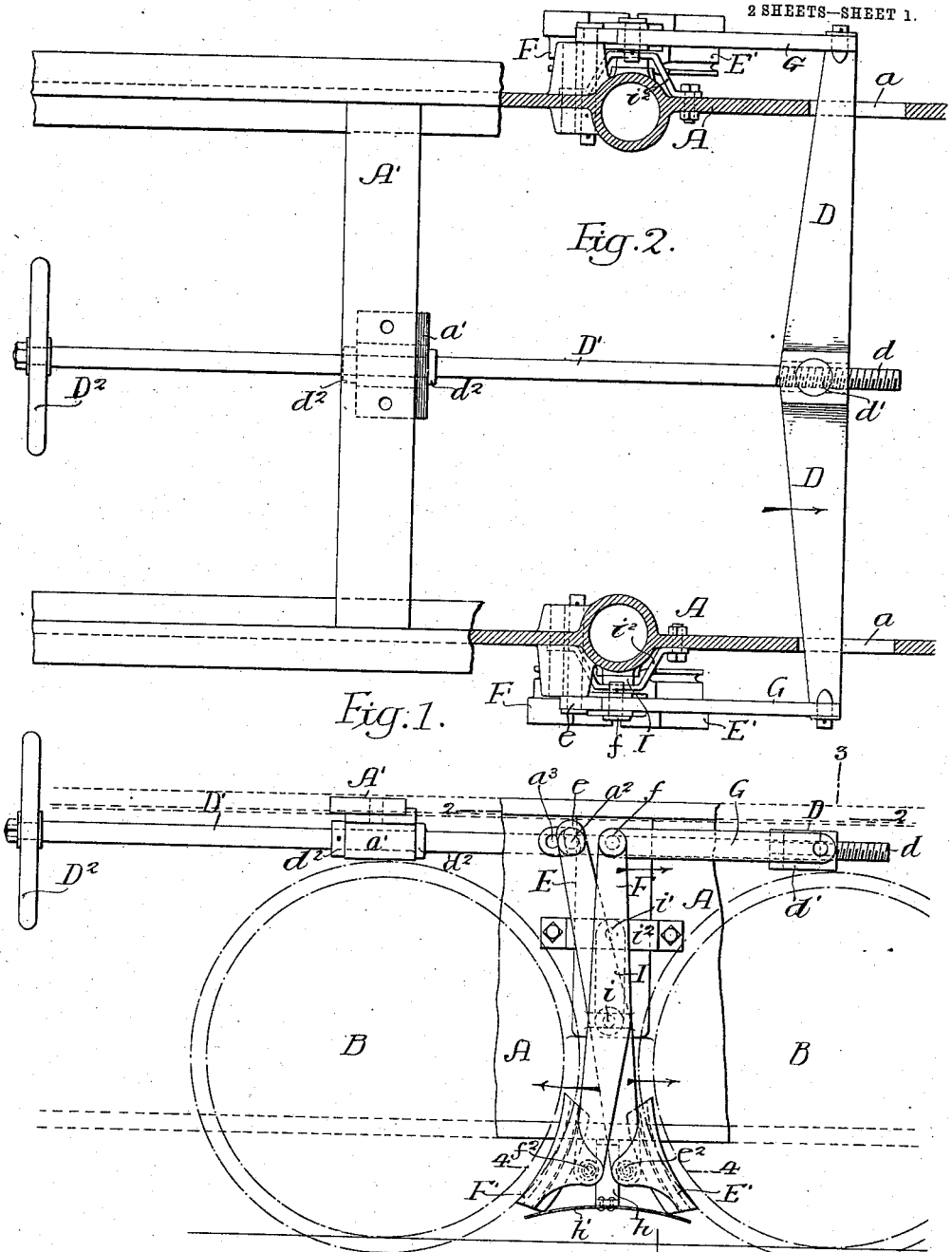

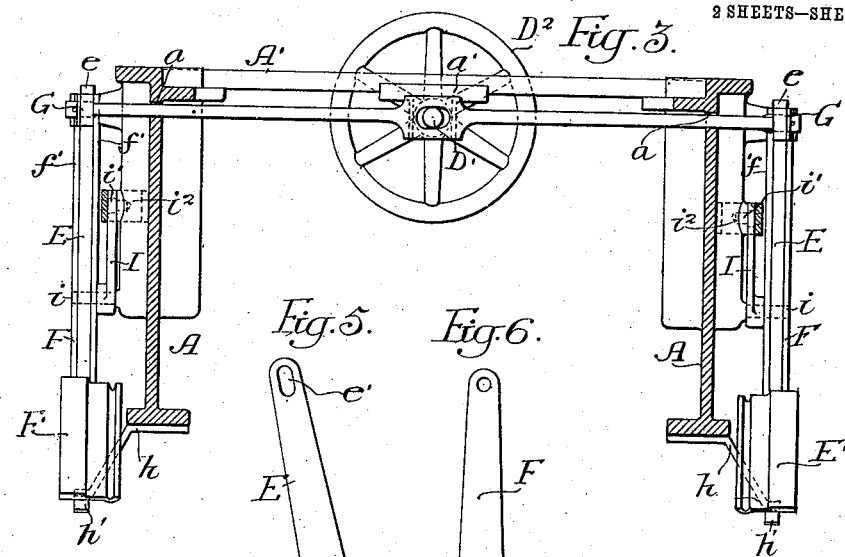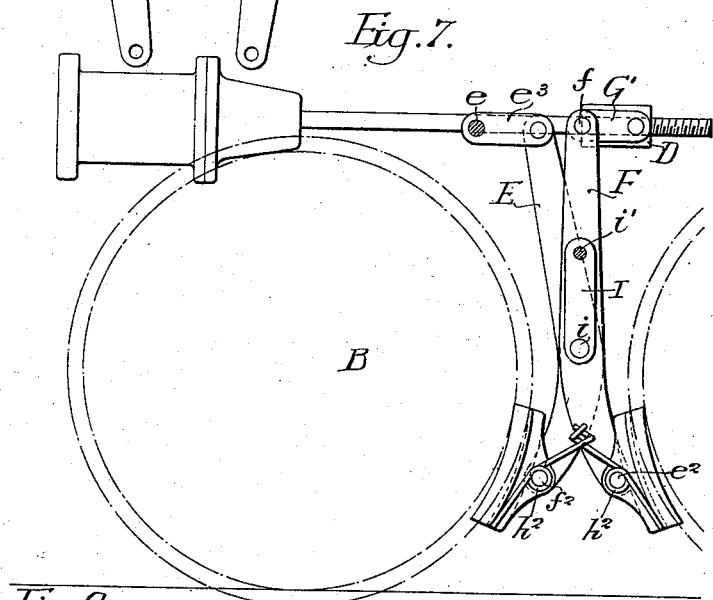

KENNETH RUSHTON, OF PHILADELPHIA, PENNSYLVANIA, ASSIGNOR TO BURNHAM, WILLIAMS & COMPANY, OF PHILADELPHIA, PENNSYLVANIA, A FIRM.

BRAKE MECHANISM.

No. 873,459.    Specification of Letters Patent.    Patented Dec. 10, 1907.

Application filed March 20, 1907. Serial No. 363,412.

*To all whom it may concern:*

Be it known that I, KENNETH RUSHTON, a citizen of the United States, residing in Philadelphia, Pennsylvania, have invented certain Improvements in Brake Mechanism, of which the following is a specification.

My invention relates to certain improvements in brake mechanism for locomotives, particularly of the electric type, in which the wheels are placed close together.

The object of my invention is to so devise a brake that the mechanism can be placed between the wheels and operated by any suitable device without spacing the wheels apart beyond a certain distance.

In electric locomotives, particularly of the type used in mines, it is desirable to have the wheels as close together as possible, and while the invention is particularly adapted for use in connection with mine locomotives, it can be used on other types of locomotives or cars without departing from the essential features of the invention.

Referring to the accompanying drawings:—Figure 1, is a side view showing sufficient of an electric locomotive and its wheels to illustrate my invention, and as the invention relates particularly to brake mechanism I have omitted other parts that have no bearing on the invention; Fig. 2, is a sectional plan view of Fig. 1, on the line 2—2; Fig. 3, is a transverse sectional view on the line 3—3, Fig. 1; Fig. 4, is an inverted sectional view on the line 4—4, Fig. 1; Figs. 5 and 6, are details of the invention illustrated in Fig. 1; and Fig. 7, is a view illustrating a modification of the invention.

In the present instance, A—A are the side frames of an electric locomotive.

B—B— indicate the wheels, which are shown by dotted lines in the present instance, and A' is a cross bar secured to the frame of the locomotive.

D is the brake beam extending from one side of the frame to the other. This beam passes through slots $a$—$a$ in the frame, as indicated, and is connected at its outer ends to the brake mechanism described hereafter.

D' is an operating shaft adapted to bearings $a'$ secured to the cross frame A' and the screw threaded end $d$ of the shaft passes through a nut $d'$ mounted in the brake beam D. Collars $d^2$ on each side of the bearing $a'$ prevent the operating shaft D' from moving longitudinally. On the end of the shaft is an operating wheel $D^2$, Fig. 2, and on turning this wheel the shaft D' will turn in the nut $d'$ and move the brake beam longitudinally in either direction according to the direction of movement of the hand wheel. The nut, in the present instance, is swiveled in the brake beam so that it will accommodate itself to any irregularities.

The brake beam D may be operated by an air cylinder, as shown in Fig. 7, or by steam cylinder or vacuum diaphragm if desired.

E and F are two levers pivoted together at $i$. The pivot pin $i$ also passes through a link I pivoted at $i'$ to the frame A, so that both levers are free to swing on the frame. A strap $i^2$ forms a bearing for the outer end of the pivot $i'$, as clearly indicated in Fig. 3.

The lever E is connected by a pivot pin $e$ to the frame A; the frame having two openings $a^2$, $a^3$, so that the pivot pin can be adjusted to fit either opening, and the opening in the lever E for the pivot pin $e$ is in the form of a slot $e'$ so as to allow the lever to swing freely with the link.

The lever F is connected by a pin $f$ to a link G, which is connected to the end of the brake beam D, as clearly illustrated in Figs. 1 and 2, so that any movement of the brake beam will be imparted to the said lever F.

E' is a brake shoe pivoted to the lower end of the lever E and F' is a brake shoe pivoted to the lower end of the lever F. These two shoes are arranged to bear against the wheels B—B, as shown by dotted lines in Fig. 1.

Carried by a bracket $h$ projecting from the frame A is a plate spring $h'$, which bears against the lower portions of the brake shoes and tends to hold them in any position when disengaged from the wheels, but other means of holding the brakes may be used without departing from the essential features of the invention. For instance, as shown in Fig. 7, I have mounted coil springs $h^2$ on the pivots $e^2$ and $f^2$ of the brake shoes. One end of each spring bears upon the shoe and the other end bears against the backs of their respective levers. In this figure, I have shown the lever E connected to the pin $e$ by a link $e^3$, dispensing with the slot $e'$, which is indicated in Fig. 5, and I have shown a short link G' connecting the lever F with the brake beam D.

It will be noticed on referring to Figs. 3 and 4 of the drawings, that the lever $f'$ consists of two members F' and that the lever E is a single member which extends between the two members F′, making a very compact arrangement of the lever mechanism.

The operation of the mechanism is as follows:—When it is desired to apply the brakes the hand wheel D² Figs. 1 and 2, is turned in one direction, causing the brake beam to slide in the frame in the direction of the arrow, Fig. 2, causing the lever F to move on its pivot in the direction of its arrow, bringing its brake shoe F′ against its wheel B. The moment the brake shoe is applied on the continued movement of the brake beam the lever F will cause the lever E to move on its pivot $e$ in the direction of its arrow;—applying the brake shoe B′ to its wheel B, and the more pressure applied the stronger will be the grip of the shoes against their respective wheels. By reversing the movement of the hand wheel, the levers will be retracted and the brake shoes withdrawn from their wheels; the spring plates $h$, however, holding the brake shoes in proper position. Thus while there is an extended movement of the brake shoes there is very little movement of the levers at the point where they pass through the narrowest space between the wheels, so that this improved mechanism is particularly adapted to be used where space between the wheels is limited.

I have described the brake mechanism on one side only of the locomotive or car, but it will be understood that the brake mechanism is in this instance duplicated on the other side of the locomotive or car;—one of the mechanisms being connected to one end of the brake beam and the other mechanism being connected to the other end of the brake beam, so that one operating shaft will actuate both sets of levers causing both brakes to be applied or released simultaneously.

I claim:

1. The combination in brake mechanism, of two wheels, two levers pivoted together and mounted between the wheels, means for suspending the levers at their pivots from the frame, one of the levers being attached to the frame, operating mechanism connected to the other lever, with brake shoes hung from each lever, substantially as described.

2. The combination of two wheels, a frame, two levers pivoted together and mounted between the wheels, one lever extending through the other, a link connected to the levers at the pivot point and pivoted to the frame, a brake shoe hung from the lower end of each lever, the upper end of one lever being pivoted to the frame, the upper end of the other lever being connected to operating mechanism, substantially as described.

3. The combination of two wheels, a frame, two levers pivoted together and mounted between the wheels, a link connected to the levers at the pivot and pivoted to the frame, a brake shoe attached to one end of each lever, the opposite end of one of the levers being slotted, a pin projecting through the slot and attached to the frame, a link connected to the other lever, and a brake beam attached to the link, with means for moving the brake beam, substantially as described.

4. The combination of a frame of a locomotive, two wheels at each side of the frame, two sets of brake levers pivoted together each set extending between a pair of wheels, brake shoes on one side of each lever, the upper end of one lever at each side being pivoted to the frame, the upper end of the other lever at each side being connected to the brake beam, a screw shaft passing through a threaded nut on the brake beam, so that on the turning of the screw shaft the brake beam will be moved longitudinally and the levers will be operated to apply or release the brake shoes, substantially as described.

5. The combination of a frame, two wheels, two brake levers pivoted together and extending between the wheels and hung to the frame, a pivot pin secured to the frame and passing through one of the levers, operating mechanism connected to the other lever, a brake hung to the lower end of each lever, a bracket projecting from the frame, a plate spring attached to the bracket resting against the brake shoes to hold them in position when they are released from contact with the wheels, substantially as described.

In testimony whereof, I have signed my name to this specification, in the presence of two subscribing witnesses.

KENNETH RUSHTON.

Witnesses:
R. M. CAMPBELL,
J. H. KERST.